United States Patent
Wildfeuer et al.

(10) Patent No.: US 6,940,972 B2
(45) Date of Patent: Sep. 6, 2005

(54) CONTROLLING ECHO CANCELLATION

(75) Inventors: Herbert M. Wildfeuer, Santa Barbara, CA (US); Mehryar K. Garakani, Westlake Village, CA (US)

(73) Assignee: Cisco Technology, Inc., San Jose, CA (US)

( * ) Notice: Subject to any disclaimer, the term of this patent is extended or adjusted under 35 U.S.C. 154(b) by 395 days.

(21) Appl. No.: 10/188,815

(22) Filed: Jul. 2, 2002

(65) Prior Publication Data

US 2004/0017912 A1 Jan. 29, 2004

(51) Int. Cl.[7] .................................................. H04M 1/00
(52) U.S. Cl. .......................... 379/406.04; 379/406.02; 379/406.06
(58) Field of Search .................. 379/406.01, 406.02, 379/406.04, 406.06

(56) References Cited

U.S. PATENT DOCUMENTS

| 4,658,420 A | 4/1987 | Fukushi et al. | 379/407 |
| 5,014,307 A | 5/1991 | Joffe et al. | 379/410 |
| 5,689,556 A | 11/1997 | Gupta et al. | 379/410 |
| 6,212,374 B1 | 4/2001 | Scott et al. | 455/422 |

OTHER PUBLICATIONS

PCT International Search Report International Application No. PCT/US 03/20916, mailed Oct. 17, 2003, 7 pages.

*Primary Examiner*—Jefferey F. Harold
(74) *Attorney, Agent, or Firm*—Baker Botts L.L.P.

(57) ABSTRACT

Controlling echo cancellation includes receiving signals associated with a call. A signal of the signals is detected. Whether the detected signal is a high speed signal or a low speed signal is determined. Echo cancellation is disabled if the detected signal is a high speed signal. The echo cancellation is enabled if the detected signal is a low speed signal.

23 Claims, 2 Drawing Sheets

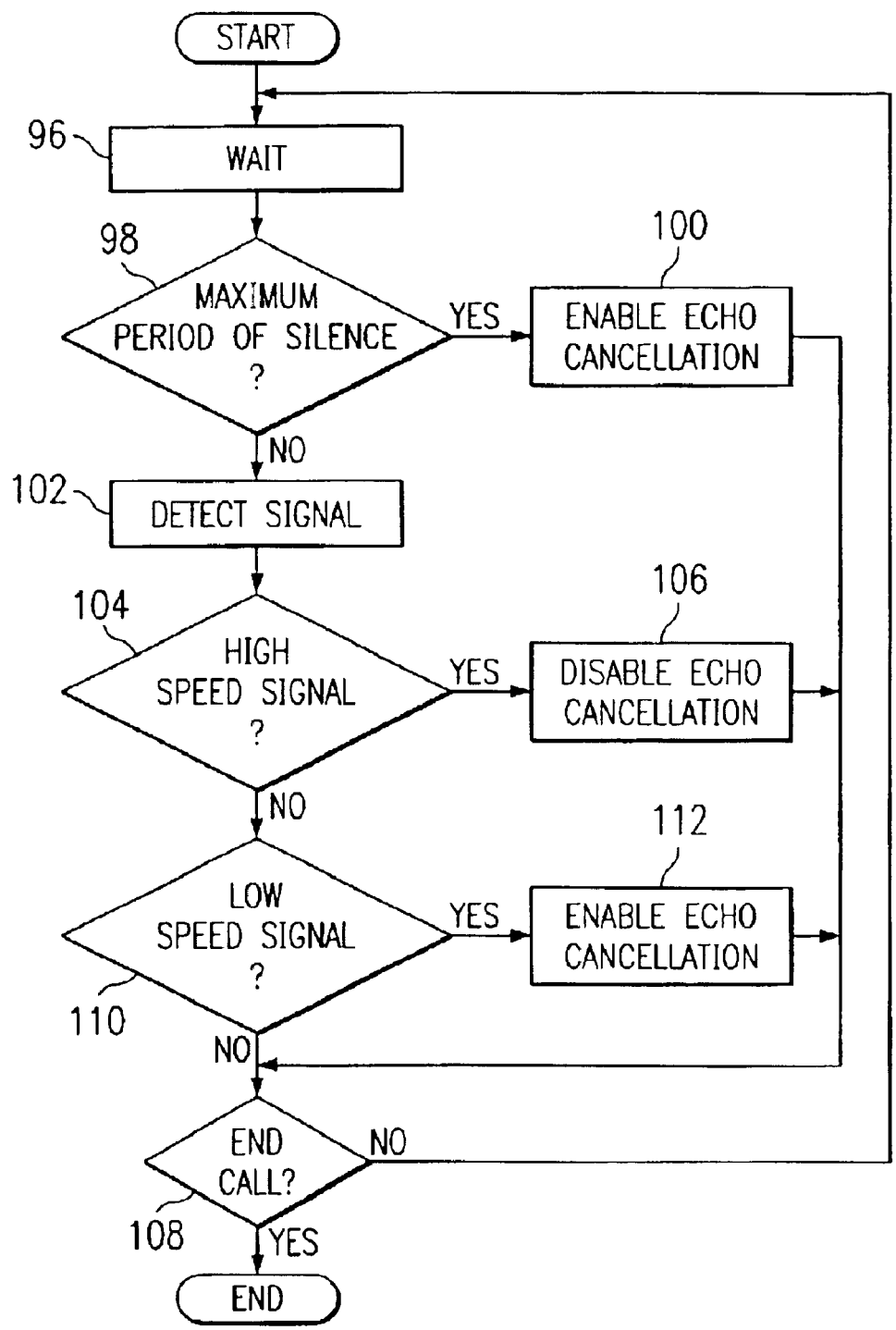

CONTROLLING ECHO CANCELLATION

TECHNICAL FIELD OF THE INVENTION

This invention relates generally to the field of telecommunications and more specifically to controlling echo cancellation.

BACKGROUND OF THE INVENTION

Echo cancellation is used to reduce echoes that may disrupt communication. Echo cancellation, however, may misidentify data signals as echoes and mistakenly remove essential data. Consequently, controlling echo cancellation has posed difficulties.

SUMMARY OF THE INVENTION

In accordance with the present invention, disadvantages and problems associated with previous techniques for controlling echo cancellation may be reduced or eliminated.

According to one embodiment of the present invention, controlling echo cancellation includes receiving signals associated with a call. A signal of the signals is detected. Whether the detected signal is a high speed signal or a low speed signal is determined. Echo cancellation is disabled if the detected signal is a high speed signal. The echo cancellation is enabled if the detected signal is a low speed signal.

Certain embodiments of the invention may provide one or more technical advantages. A technical advantage of one embodiment may be that a gateway enables echo cancellation for transmission of low speed signals, and disables echo cancellation for transmission of high speed signals. By selectively enabling and disabling echo cancellation, the gateway allows for echo cancellation for low speed signals while avoiding the misidentification of high speed data signals as echoes and mistaken removal of essential data.

Another technical advantage of one embodiment may be that a gateway disables echo cancellation in response to detecting a high speed answer, which indicates the presence of a high speed telecommunication device, and enables echo cancellation in response to detecting a low speed signal, which indicates the presence of a low speed telecommunication device.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 is a flowchart illustrating one embodiment of a method for controlling echo cancellation that may be used with the gateway of FIG. 2.

DETAILED DESCRIPTION OF THE DRAWINGS

Figure 1:
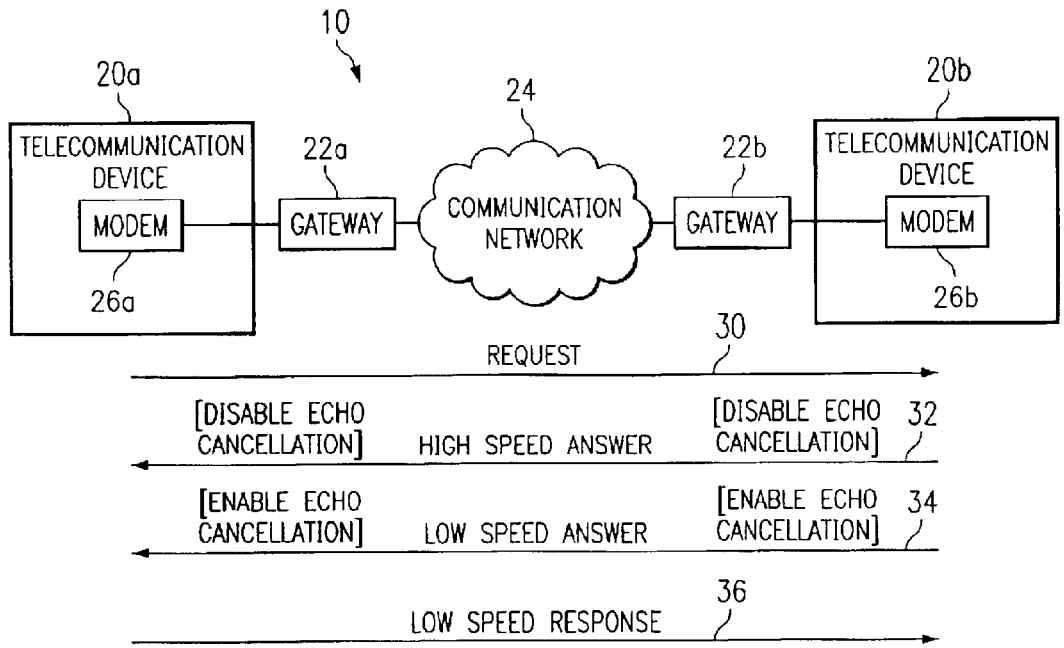
FIG. 1 is block diagram of one embodiment of a system for communicating signals.
Figure 2:
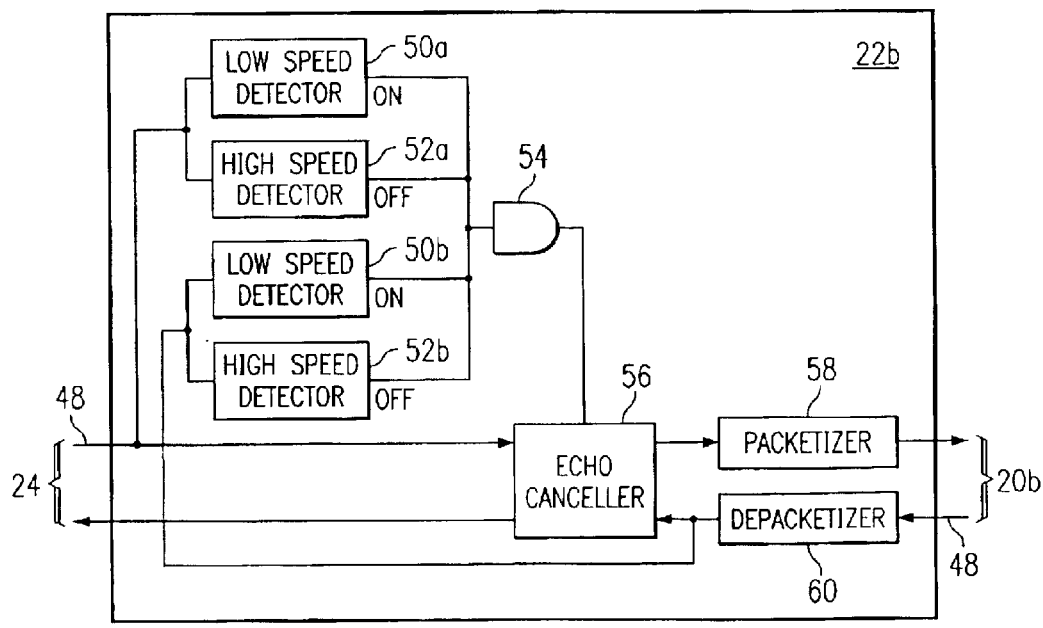
FIG. 2 is a block diagram of one embodiment of a gateway of the system of FIG. 1.

Embodiments of the present invention and its advantages are best understood by referring to FIGS. 1 through 3 of the drawings, like numerals being used for like and corresponding parts of the various drawings.

FIG. 1 is block diagram of one embodiment of a system 10 for communicating signals. System 10 controls echo cancellation such that problems associated with communicating signals may be reduced. Echo cancellation is enabled for transmission of low speed signals in order to prevent echoes from disrupting communication. Echo cancellation is disabled for transmission of high speed signals in order to avoid cancellation of high speed data signals that may be misidentified as echoes.

System 10 includes telecommunication devices 20, gateways 22, and a communication network 24. According to one embodiment, a telecommunication device 20 comprises a facsimile machine such as a Group 1, Group 2, Group 3, Group 3 enhanced, or Super GE facsimile machine. A facsimile machine allows information reported on a hard copy to be sent through communication network 24 and printed at another facsimile machine.

A facsimile machine typically includes a scanner for converting information reported on a hard copy to digital data. A digital signal processor processes the digital data. A modem 26 converts the digital data to analog signals for transmission over communication lines, and converts received analog signals to digital data. Received digital data may be stored in a memory of the facsimile machine. A printer of the facsimile machine produces a hard copy of the received digital data.

Although telecommunication devices 20 of system 10 comprise facsimile machines, it is understood by one of ordinary skill in the art that any suitable telecommunication device that comprises a modem 26 may be used, for example, a computer with a modem. As used in this document, the term "computer" refers to any device operable to accept input, process the input according to predefined rules, and produce output, for example, a personal computer, workstation, network computer, wireless data port, wireless telephone, personal digital assistant, one or more processors within these or other devices, or any other suitable processing device.

According to one example, telecommunication device 20a comprises a low speed telecommunication device such as a low speed facsimile machine, and the telecommunication device 20b comprises a high speed telecommunication device such as a high speed facsimile machine.

A low speed facsimile machine includes a low speed modem, for example, a 300 bit per second half-duplex modem that conforms to the V.21 standard of the International Telecommunication Union-Telecommunication Standardization Sector (ITU-T). Other examples of low speed modems include a V.27 2400/4800 bit per second half-duplex modem, a V.29 4800/7200/9600 bit per second half-duplex modem, or a V.17 9600/12000/14400 bit per second half-duplex modem. A V.21 modulation may be used at a half-duplex mode for Group 3 facsimile negotiation and control procedures set forth in the T.30 ITU-T standard. The low speed signals sent by low speed telecommunication device 20a may include packets that have leading and trailing 7E flags.

A high speed facsimile machine includes a high speed modem, for example, a modem of up to 28,800 bits per second that conform to the V.34 ITU-T standard. A high speed facsimile machine may conform to the T.30 ITU-T standard for high speed fax transmission. The high speed data transmission may be up to 33.6 kilo bites per second. High speed modem 20b may comprise an optional auxiliary channel that has a synchronous data signaling rate of 200 bits per second. Modem control data may be conveyed on the auxiliary channel.

High speed telecommunication device 20b may be configured to ignore signals received within a specific period of time, for example, 75 milliseconds, after sending a signal, since signals received within that period are typically echoes. In high latency networks, however, echoes may arrive after the specified period, and may be misidentified as responses.

Gateways 22 serve as interfaces between communication network 24 and external devices such as telecommunication devices 20. A gateway 22 comprises an electronic repeater device that intercepts and steers signals from one network to another. Gateway 22 typically includes a signal conditioner that filters out unwanted noise and control characters.

Gateway 22 controls echo cancellation by enabling echo cancellation for low speed signals to prevent echoes from disrupting communication, and disabling echo cancellation for high speed signals to avoid cancellation of high speed data signals that may be misidentified as echoes. Gateway 22b is described in more detail with reference to FIG. 2. A method for controlling echo cancellation using gateway 22b is described in more detail with reference to FIG. 3.

Communication network 24 comprises a public switched telephone network or other suitable communication links such as a public or private data network, the Internet, a wireline or wireless network, a local, regional, or global communication network, or any combination of the preceding.

In operation, originating telecommunication device 20a calls answering telecommunication device 20b. Telecommunication device 20a and 20b may negotiate their capabilities and type of session according to the V.8 ITU-T standard. Telecommunication device 20a sends a request 30 to telecommunication device 20b.

In response, high speed telecommunication device 20b sends a high speed answer 32. High speed answer 32 may comprise, for example, a ANSam signal, which comprises a phase-reversed high frequency signal such as a 2100 Hertz tone. High speed answer 32 disables the echo cancellation feature of gateways 22a and 22b to avoid cancellation of high speed data signals that may be misidentified as echoes. Echo cancellation may be disabled when gateway 22 detects high speed answer 32 by, for example, detecting a phase-reversed 2100 Hertz tone.

Typically, high speed modem 26b recognizes high speed answer 32, and low speed modem 26a ignores high speed answer 32. If answering telecommunication device 20b does not receive a suitable response to high speed answer 32 within a specific period of time, telecommunication device 20b assumes that originating telecommunication device 20a is a low speed device, and sends a low speed answer 34. Low speed answer 34 may comprise a digital identification signal (DIS) frame of a T.30 signal that uses V.21 channel 2 and conforms to the V.21 ITU-T standard. Low speed answer 34 may comprise leading and trailing flags such as 7E flags.

Low speed answer 34 enables the echo cancellation features of gateways 22. Echo cancellation may be enabled when gateway 22 detects low speed answer 34 by, for example, detecting the 7E flags. Echo cancellation is enabled in order to avoid an echo forming from low speed answer 34. Upon receiving low speed answer 34, originating telecommunication device 20a sends a low speed response 36. Low speed response 36 may comprise a digital command signal (DSC) that conforms to the V.21 ITU-T standard.

According to another embodiment, originating telecommunication device 20a comprises an originating high speed facsimile machine. In response to receiving high speed answer 32, the originating high speed facsimile machine sends a high speed response, which does not enable echo cancellation. Accordingly, two high speed facsimile machine communicate with the echo cancellation disabled.

FIG. 2 is a block diagram of one embodiment of gateway 22b of system 10. Gateway 22b enables echo cancellation for transmission of low speed signals to prevent echoes from disrupting communication, and disables echo cancellation for transmission of high speed signals to avoid cancellation of high speed data signals that may be misidentified as echoes.

Gateway 22b includes inputs 48, low speed detectors 50, high speed detectors 52, an OR gate 54, an echo canceller 56, a packetizer 58, and a depacketizer 60. Gateway 22b receives signals through inputs 48. Low speed detector 50a and high speed detector 52a receive signals from telecommunication device 20a, and determine whether telecommunication device 20a is sending high speed signals or low speed signals. Low speed detector 50b and high speed detector 52b receive signals from telecommunication device 20b, and determine whether telecommunication device 20b is sending high speed signals or low speed signals. A low speed detector 50 may comprise a V.21 flag detector that detects 7E flags, which identify low speed signals. A high speed detector 52 may comprise a G.168 detector that detects high speed answer 32 such as a ANSam signal.

OR gate 54 signals echo canceller 56 in response to signals received from low speed detectors 50 and high speed detectors 52. If high speed answer 32 is received from either telecommunication device 20, OR gate 54 signals echo canceller 56 to disable echo cancellation. If a low speed response is received by low speed detectors 50, OR gate 54 signals echo canceller 56 to enable echo cancellation. Additionally, echo canceller 56 may enable echo cancellation if there is a period of silence for a specific period of time, for example, 400 milliseconds according to the G.165/G.168 specification. Echo canceller 56 may cancel an echo by estimating the echo path between gateway 22 and telecommunication device 20, using the path estimate to create an estimated echo signal, and subtracting the estimated echo signal from the signal entering input 48.

Packetizer 58 places data in packets and transmits the packets to the remote gateway. Depacketizer 60 extracts data from packets received from the remote gateway and sends the data to echo canceller 56.

FIG. 3 is a flowchart illustrating one embodiment of a method for controlling echo cancellation. The method begins at step 96, where gateway 22 waits to receive signals. Gateway 22 determines whether a maximum period of silence has occurred at step 98. If a maximum period of silence has occurred, the method proceeds to step 100, where echo canceller 56 enables echo cancellation. After enabling echo cancellation, the method proceeds to step 108, where gateway 22 determines whether the call has ended.

If a maximum period of silence has not occurred at step 98, the method proceeds to step 102. A signal is detected at step 102. High speed detector 52 determines whether the detected signal is a high speed signal such as high speed answer 32. If the detected signal is a high speed signal, the method proceeds to step 106, where echo cancellation is disabled.

If the detected signal is not a high speed signal at step 104, the method proceeds to step 110, where low speed detector 50 determines whether the detected signal is a low speed signal. If the detected signal is a low speed signal, the method proceeds to step 112, where echo cancellation is enabled. After enabling echo cancellation, the method proceeds to 108. Gateway 22 determines whether the call has ended at step 108. If the call has not ended, the method returns to step 96, where gateway 22b continues to wait for signals. If the call has ended, the method terminates.

Certain embodiments of the invention may provide one or more technical advantages. A technical advantage of one embodiment may be that a gateway enables echo cancellation for transmission of low speed signals, and disables echo cancellation for transmission of high speed signals. By selectively enabling and disabling echo cancellation, the gateway allows for echo cancellation for low speed signals while avoiding the misidentification of high speed data signals as echoes and mistaken removal of essential data.

Another technical advantage of one embodiment may be that a gateway disables echo cancellation in response to detecting a high speed answer, which indicates the presence of a high speed telecommunication device, and enables echo cancellation in response to detecting a low speed signal, which indicates the presence of a low speed telecommunication device.

Although an embodiment of the invention and its advantages are described in detail, a person skilled in the art could make various alterations, additions, and omissions without departing from the spirit and scope of the present invention as defined by the appended claims.

What is claimed is:

1. A method for controlling echo cancellation, comprising:
   receiving a plurality of signals from a telecommunication device associated with a call, the telecommunication device comprising at least one of an originating telecommunication device and an answering telecommunication device of the call;
   detecting a signal of the plurality of signals;
   determining whether the detected signal from the telecommunication device comprises a high speed signal or a low speed signal, the high speed signal having a higher frequency than the low speed signal;
   disabling echo cancellation if the detected signal comprises the high speed signal; and
   enabling the echo cancellation if the detected signal comprises the low speed signal.

2. The method of claim 1, further comprising:
   determining that a maximum period of silence has occurred; and
   enabling the echo cancellation in response to the determination.

3. The method of claim 1, wherein determining whether the detected signal comprises a high speed signal or a low speed signal comprises:
   detecting that the detected signal has a frequency greater than 2000 Hertz;
   detecting that the detected signal has a reversed phase; and
   determining that the detected signal comprises the high speed signal.

4. The method of claim 1, wherein determining whether the detected signal comprises a high speed signal or a low speed signal comprises:
   detecting that the detected signal has a frequency of approximately 2100 Hertz;
   detecting that the detected signal has a reversed phase; and
   determining that the detected signal comprises the high speed signal.

5. The method of claim 1, wherein determining whether the detected signal comprises a high speed signal or a low speed signal comprises:
   establishing that the detected signal comprises a V.21 signal; and
   determining that the detected signal comprises the low speed signal.

6. The method of claim 1, wherein determining whether the detected signal comprises a high speed signal or a low speed signal comprises:
   establishing that the detected signal comprises a V.34 signal; and
   determining that the detected signal comprises the high speed signal.

7. A method for controlling echo cancellation, comprising:
   receiving a plurality of signals associated with a call;
   detecting a signal of the plurality of signals;
   determining whether the detected signal comprises a high speed signal or a low speed signal by:
      establishing that the detected signal comprises a packet comprising a 7E flag; and
      determining that the detected signal comprises the low speed signal;
   disabling echo cancellation if the detected signal comprises the high speed signal; and
   enabling the echo cancellation if the detected signal comprises the low speed signal.

8. A apparatus for controlling echo cancellation, comprising:
   an input operable to receive a plurality of signals from a telecommunication device associated with a call, the telecommunication device comprising at least one of an originating telecommunication device and an answering telecommunication device of the call;
   a high speed detector coupled to the input and operable to:
      detect a signal of the plurality of signals; and
      determine whether the detected signal from the telecommunication device comprises a high speed signal;
   a low speed detector coupled to the input and operable to:
      detect the signal; and
      determine whether the detected signal from the telecommunication device comprises a low speed signal, the high speed signal having a higher frequency than the low speed signal; and
   an echo canceller coupled to the low speed detector and the high speed detector and operable to:
      disable echo cancellation if the detected signal comprises the high speed signal; and
      enable the echo cancellation if the detected signal comprises the low speed signal.

9. The apparatus of claim 8, wherein the echo canceller is operable to:
   determine that a maximum period of silence has occurred; and
   enable the echo cancellation in response to the determination.

10. The apparatus of claim 8, wherein the high speed detector is operable to determine whether the detected signal comprises a high speed signal by:
   detecting that the detected signal has a frequency greater than 2000 Hertz;
   detecting that the detected signal has a reversed phase; and
   determining that the detected signal comprises the high speed signal.

11. The apparatus of claim 8, wherein the high speed detector is operable to determine whether the detected signal comprises a high speed signal by:
  detecting that the detected signal has a frequency of approximately 2100 Hertz;
  detecting that the detected signal has a reversed phase; and
  determining that the detected signal comprises the high speed signal.

12. The apparatus of claim 8, wherein the low speed detector is operable to determine whether the detected signal comprises a low speed signal by:
  establishing that the detected signal comprises a V.21 signal; and
  determining that the detected signal comprises the low speed signal.

13. The apparatus of claim 8, wherein the high speed detector is operable to determine whether the detected signal comprises a high speed signal by:
  establishing that the detected signal comprises a V.34 signal; and
  determining that the detected signal comprises the high speed signal.

14. An apparatus for controlling echo cancellation, comprising:
  an input operable to receive a plurality of signals associated with a call;
  a high speed detector coupled to the input and operable to:
    detect a signal of the plurality of signals; and
    determine whether the detected signal comprises a high speed signal;
  a low speed detector coupled to the input and operable to:
    detect the signal; and
    determine whether the detected signal comprises a low speed signal by:
      establishing that the detected signal comprises a packet comprising a 7E flag; and
      determining that the detected signal comprises the low speed signal; and
  an echo canceller coupled to the low speed detector and the high speed detector and operable to:
    disable echo cancellation if the detected signal comprises the high speed signal; and
    enable the echo cancellation if the detected signal comprises the low speed signal.

15. Logic for controlling echo cancellation, the logic embodied in a medium and operable to:
  receive a plurality of signals from a telecommunication device associated with a call, the telecommunication device comprising at least one of an originating telecommunication device and an answering telecommunication device of the call;
  detect a signal of the plurality of signals;
  determine whether the detected signal from the telecommunication device comprises a high speed signal or a low speed signal, the high speed signal having a higher frequency than the low speed signal;
  disable echo cancellation if the detected signal comprises the high speed signal; and
  enable the echo cancellation if the detected signal comprises the low speed signal.

16. The logic of claim 15, further operable to:
  determine that a maximum period of silence has occurred; and
  enable the echo cancellation in response to the determination.

17. The logic of claim 15, operable to determine whether the detected signal comprises a high speed signal or a low speed signal by:
  detecting that the detected signal has a frequency greater than 2000 Hertz;
  detecting that the detected signal has a reversed phase; and
  determining that the detected signal comprises the high speed signal.

18. The logic of claim 15, operable to determine whether the detected signal comprises a high speed signal or a low speed signal by:
  detecting that the detected signal has a frequency of approximately 2100 Hertz;
  detecting that the detected signal has a reversed phase; and
  determining that the detected signal comprises the high speed signal.

19. The logic of claim 15, operable to determine whether the detected signal comprises a high speed signal or a low speed signal by:
  establishing that the detected signal comprises a V.21 signal; and
  determining that the detected signal comprises the low speed signal.

20. The logic of claim 15, operable to determine whether the detected signal comprises a high speed signal or a low speed signal by:
  establishing that the detected signal comprises a V.34 signal; and
  determining that the detected signal comprises the high speed signal.

21. Logic for controlling echo cancellation, the logic embodied in a medium and operable to:
  receive a plurality of signals associated with a call:
  detect a signal of the plurality of signals;
  determine whether the detected signal comprises a high speed signal or a low speed signal by:
    establishing that the detected signal comprises a packet comprising a 7E flag; and
    determining that the detected signal comprises the low speed signal;
  disable echo cancellation if the detected signal comprises the high speed signal; and
  enable the echo cancellation if the detected signal comprises the low speed signal.

22. A system for controlling echo cancellation, comprising:
  means for receiving a plurality of signals from a telecommunication device associated with a call, the telecommunication device comprising at least one of an originating telecommunication device and an answering telecommunication device of the call;
  means for detecting a signal of the plurality of signals;
  means for determining whether the detected signal from the telecommunication device comprises a high speed signal or a low speed signal, the high speed signal having a higher frequency than the low speed signal;
  means for disabling echo cancellation if the detected signal comprises the high speed signal; and
  means for enabling the echo cancellation if the detected signal comprises the low speed signal.-

23. A method for controlling echo cancellation, comprising: receiving a plurality of signals associated with a call;

detecting a signal of the plurality of signals;

determining whether the detected signal comprises a high speed signal or a low speed signal by:

establishing that the detected signal comprises a packet comprising a 7E flag if the detected signal comprises the low speed signal; and detecting that the detected signal has a frequency of approximately 2100 Hertz and detecting that the detected signal has a reversed phase if the detected signal comprises the high speed signal;

disabling echo cancellation if the detected signal comprises the high speed signal;

enabling the echo cancellation if the detected signal comprises the low speed signal; and enabling the echo cancellation if a maximum period of silence has occurred.

\* \* \* \* \*